United States Patent
Barakat (10) Patent No.: US 8,112,313 B1
(45) Date of Patent: Feb. 7, 2012

(54) SYSTEM AND METHOD FOR BROADCASTING A CHARGE TONE DURING AN ELECTRONIC TRANSACTION

(76) Inventor: Bradley Barakat, Allen, TX (US)

( * ) Notice: Subject to any disclaimer, the term of this patent is extended or adjusted under 35 U.S.C. 154(b) by 0 days.

(21) Appl. No.: 11/876,805

(22) Filed: Oct. 23, 2007

(51) Int. Cl.
*G06Q 20/00* (2006.01)
*G06Q 30/00* (2006.01)

(52) U.S. Cl. .................. 705/16; 705/14.38; 705/14.65

(58) Field of Classification Search .............. 705/16–25
See application file for complete search history.

(56) References Cited

U.S. PATENT DOCUMENTS

| 6,401,074 B1 * | 6/2002 | Sleeper ............... 705/14.65 |
| 2001/0044751 A1 * | 11/2001 | Pugliese et al. ........... 705/26 |
| 2004/0039919 A1 * | 2/2004 | Takayama et al. ......... 713/180 |

\* cited by examiner

*Primary Examiner* — Ig T An
(74) *Attorney, Agent, or Firm* — Michael Diaz (57) ABSTRACT

A system and method of broadcasting a tone during an electronic transaction. The system includes a point of sale (POS) unit for receiving credit card information utilized for an electronic transaction, an authorization system for authorizing the electronic transaction by the credit card, and a tone bank for storing a tone. The tone bank associates the tone with the credit card information. The POS unit includes a speaker for broadcasting the tone. The stored tone is retrieved and broadcast at the POS unit in response to utilizing the credit card information for the electronic transaction. The POS unit may optionally broadcast a video clip.

13 Claims, 9 Drawing Sheets

SYSTEM AND METHOD FOR BROADCASTING A CHARGE TONE DURING AN ELECTRONIC TRANSACTION

BACKGROUND OF THE INVENTION

1. Field of the Invention

This invention relates to electronic transactions. Specifically, and not by way of limitation, the present invention relates to system and method of broadcasting a charge tone or video stream during an electronic transaction.

2. Description of the Related Art

Figure 1:
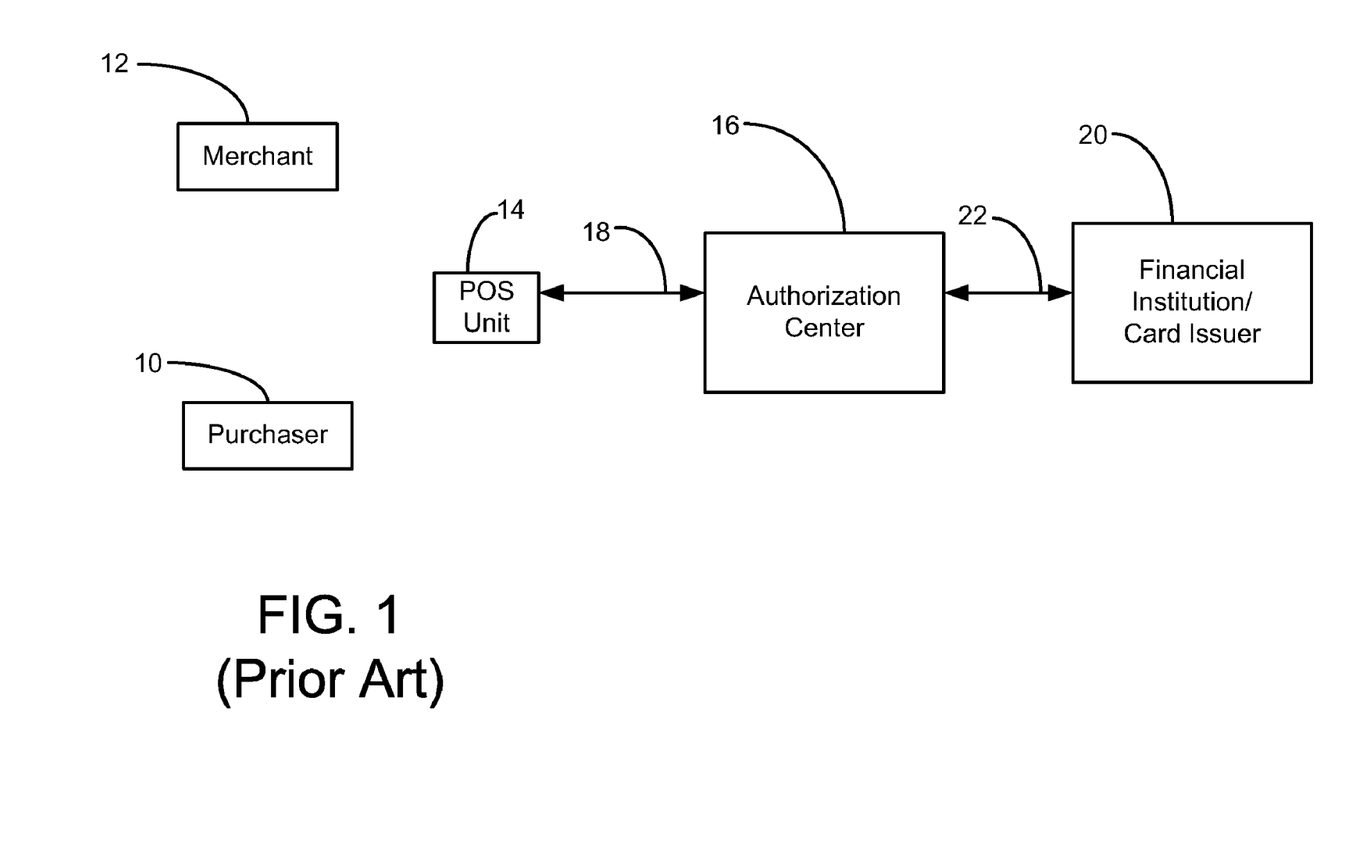
FIG. 1 (prior art) is a block diagram illustrating an existing credit card transaction scenario.

Millions of credit card transactions occur every day. Purchases by credit cards account for billions of dollars. There is no question that credit card purchases are an important tool for enacting transactions globally. FIG. 1 is a block diagram illustrating an existing credit card transaction scenario. A purchaser 10 buys an item from a merchant 12 using a credit card. The purchaser typically swipes a credit card through a point of sale (POS) unit 14, which collects relevant credit card information for the purchase. The merchant, through the POS unit 14, then requests authorization for the credit card transaction by communicating with an authorization center 16 via a communications link 18. In most cases, the link 18 is a direct electronic link to the authorization center. The authorization center then verifies that the purchaser's credit card account is a valid account and has available credit by querying an issuing financial institution/card issuer 20 via a communications link 22. The issuing financial institution/card issuer keeps and processes all transactions of the purchaser's credit card account. The issuing financial institution/card issuer then responds to the query by either authorizing or rejecting the requested credit card transaction. The authorization center then relays the authorization or rejection message to the merchant through the POS unit 14. The merchant, upon receiving proper authorization from the authorization center, delivers the item to the purchaser.

The entire transaction process typically takes place within a span of time varying from ten to thirty seconds. During this span of time, the purchase must simply wait for the transaction to be completed. However, currently there is no aural or visual display which diverts the attention, entertains or informs the purchaser during this "dead" time. A system and method are needed providing an aural and/or visual presentation to the purchaser.

Therefore, it would be advantageous to provide a system and method of broadcasting a tone or video stream during an electronic transaction, such as a credit card transaction. It is an object of the present invention to provide such a system and method.

SUMMARY OF THE INVENTION

In one aspect, the present invention is directed to a system for broadcasting a tone during an electronic transaction. The system includes a point of sale (POS) unit for receiving credit card information utilized for an electronic transaction, an authorization system for authorizing the electronic transaction by the credit card, and a tone bank for storing a tone. The tone bank associates the tone with the credit card information. The POS unit includes a speaker for broadcasting the tone. The stored tone is retrieved and broadcast at the POS unit in response to utilizing the credit card information for the electronic transaction.

In another aspect, the present invention is directed to a method of broadcasting a tone during an electronic transaction. The method begins by allocating a tone to a credit card. The tone is associated with the credit card and stored in a tone bank. An electronic transaction is then initiated utilizing the credit card. Next, an authorization request is sent by a POS unit to an authorization center. The authorization request requests authorization for utilizing the credit card to conduct the electronic transaction. The electronic transaction is then authorized. In addition, the stored tone is retrieved from the tone bank. The tone is sent to the POS unit and broadcast.

In another aspect, the present invention is directed to a system for broadcasting a video stream during an electronic transaction. The system includes a POS unit for receiving credit card information utilized by a purchaser having a credit card for an electronic transaction, an authorization system for authorizing the electronic transaction by the credit card, and a video bank for storing a video stream. The video bank associates the video stream with the credit card information. The POS unit broadcasts the video stream. The stored video stream is retrieved and broadcast at the POS unit in response to utilizing the credit card information for the electronic transaction.

DESCRIPTION OF THE INVENTION

Figure 2:
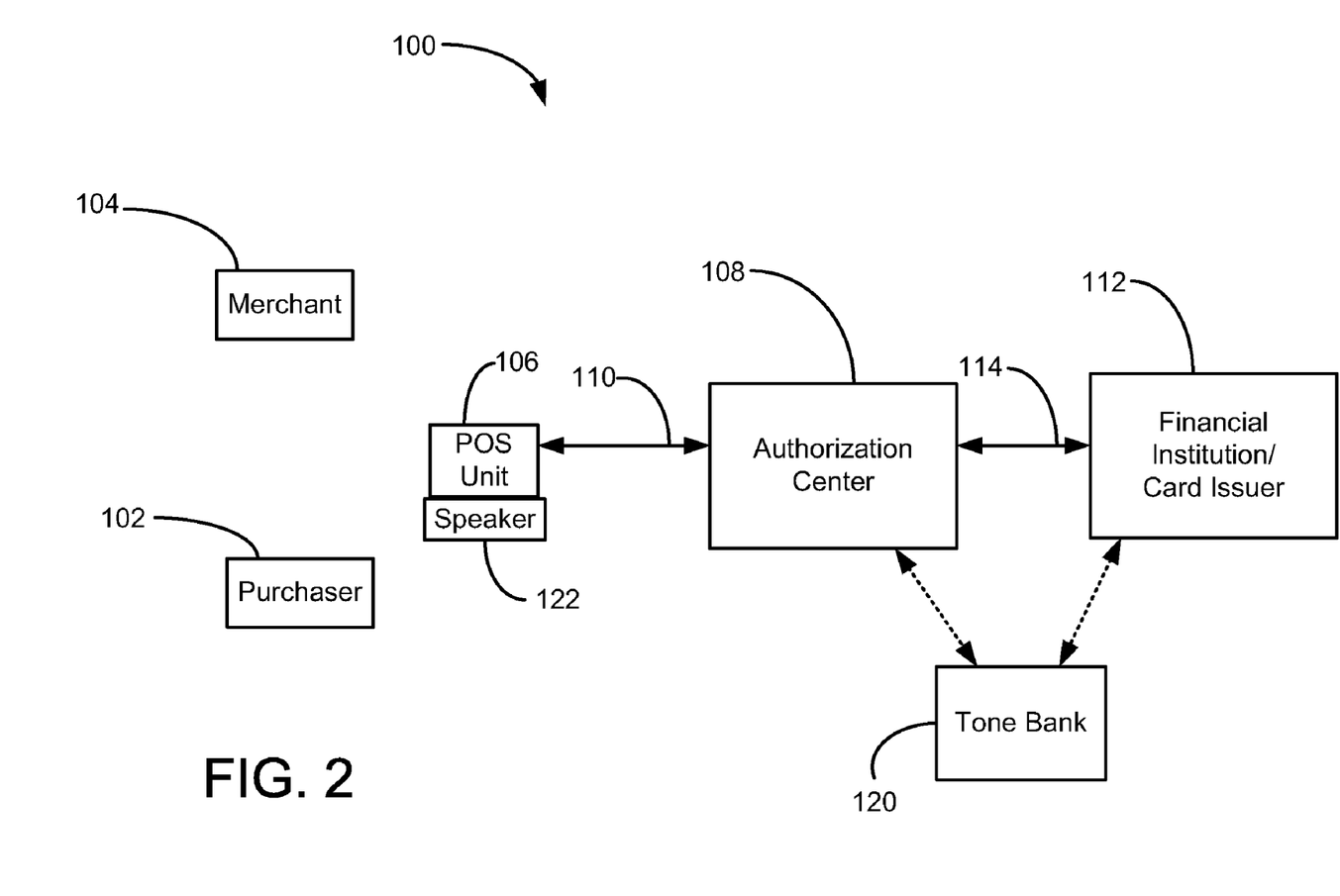
FIG. 2 is a block diagram illustrating components of an electronic transaction system for broadcasting a charge tone in the preferred embodiment of the present invention.

The present invention relates to a system and method of broadcasting a charge tone or video stream during an electronic transaction. FIG. 2 is a block diagram illustrating components of an electronic transaction system 100 for broadcasting a charge tone in the preferred embodiment of the present invention. A purchaser 102 buys an item from a merchant 104 using a credit card. The purchaser typically swipes a credit card through a point of sale (POS) unit 106, which collects relevant credit card information for the purchase. The merchant, through the POS unit 106, then requests authorization for the credit card transaction by communicating with an authorization center 108 via a communications link 110. In most cases, the link 110 is a direct electronic link to the authorization center. The authorization center then verifies that the purchaser's credit card account is a valid account and has available credit by querying an issuing financial institution/card issuer 112 via a communications link 114. The issuing financial institution/card issuer keeps and processes all transactions of the purchaser's credit card account. The issuing financial institution/card issuer then responds to the query by either authorizing or rejecting the requested credit card transaction. The authorization center then relays the authorization or rejection message to the merchant through the POS unit 106. The merchant, upon receiving proper authorization from the authorization center, delivers the item to the purchaser.

The present invention includes a tone bank 120 which stores one or more tones purchased or allocated to the purchaser's credit card. The tone may be a song, a series of musical notes, or any other sound. Alternately, the tone may be a verbal credit, acknowledging the purchase transaction or advertising an item, retail store, or other entity. Either during the authorization process or after approval of the transaction, the POS unit retrieves a tone from the tone bank and broadcasts the tone to the purchaser. The tone bank may be coupled to the authorization center 108, the financial institution/card issuer 112, or the POS unit 106. Alternatively, the tone bank may be a standalone unit. The tone bank is preferably secured in a similar manner as information held on the user's credit card. Thus, a secure communication link, proper authentication of the credit card user and sufficient security to prevent hacking of the tone bank is preferred.

The POS unit 106 includes a speaker 122 or other sound device to broadcast the tone. The term tone is used to describe any type of aural presentation, such as a song, series of notes, verbal communication, etc. Prior to use of the electronic transaction system 100, the purchaser must be allocated one or more tones, either by purchasing the tone or being awarded the tone. Each credit card may have its own specific tone or tones. If the credit card is allocated more than one tone, the tones may be rotated for each transaction. Alternately, the tones may be chosen based on the type of transaction, point of sale, time of day, day of week, or any other specified manner.

Figure 3:
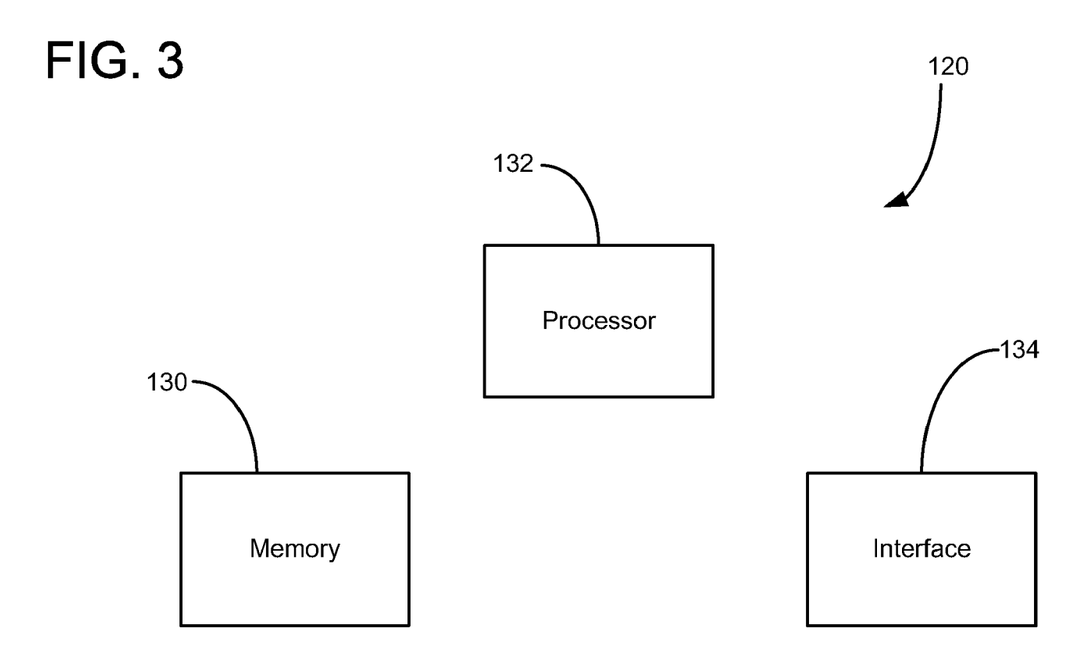
FIG. 3 is a simplified block diagram of the components of the tone bank utilized in the electronic transaction system of FIG. 2.

FIG. 3 is a simplified block diagram of the components of the tone bank 120. The tone bank 120 includes a memory 130, a processor 132, and an interface 134. The memory stores the tones and relevant credit card information associated with the credit card. The interface allows authorized access to the memory. Authorization may be through the authorization center or may include a separate authentication system. The purchaser may purchase or be awarded one or more tones. The purchaser's credit card is then associated with the specified tone which is held in the memory of the tone bank. The processor is utilized for matching the credit card information with the stored tone and retrieving the relevant tone for the credit card.

Prior to utilization of the electronic transaction system 100, one or more tones must be allocated to the purchaser's credit card. For the purchase of tones, the purchaser may access the tone bank 120 either directly or via the financial institution/card issuer 112. For example, a website may be set up or coupled within the financial institution/card issuer 112's website, offering the sale of tones. Alternately, the purchase of tones may be conducted during a credit card transaction at the POS unit 106. The POS unit may query the purchaser for the purchase of the tone. In an alternate embodiment of the present invention, the tones may be awarded by the financial institution/card issuer, a retail store, or any other entity.

With reference to FIGS. 2 and 3, the operation of the electronic transaction system 100 will now be explained. The purchaser, prior to use of the electronic transaction system 100, must be allocated, either through the purchase or award, one or more tones. The tones and associated relevant credit card information are stored in the memory 130 of the tone bank 120. Next, the purchaser 102 initiates a credit card transaction by swiping the purchaser's credit card through the POS unit 106. Alternatively, the merchant may swipe the card in the POS unit. An authorization request for the credit card transaction is then sent to the authorization center 108 via the communications link 110. The authorization center then verifies that the purchaser's credit card account is a valid account and has available credit by querying the issuing financial institution/card issuer 112 via a communications link 114. The issuing financial institution/card issuer keeps and processes all transactions of the purchaser's credit card account. The issuing financial institution/card issuer then responds to the query by either authorizing or rejecting the requested credit card transaction. The authorization center then relays the authorization or rejection message to the merchant through the POS unit 106. Alternately, the authorization center authenticates the credit card transaction without communicating with the issuing financial institution/card issuer 112. The merchant, upon receiving proper authorization from the authorization center, delivers the item to the purchaser. During the authorization process, the tone bank is accessed through the interface 134, either by the financial institution/card issuer 112, the authorization center 108 or the POS unit 106. The processor 132 receives the credit card transaction, retrieves the appropriate tone from the memory 130, and sends the retrieved tone to the POS unit 106. The retrieved tone is then broadcast through the speaker 122 to the purchaser 102. The retrieved tone may be broadcast during the waiting period of the authentication process or upon approval, thereby providing the purchaser an aural indication of the success of the credit card transaction.

Figure 4A:
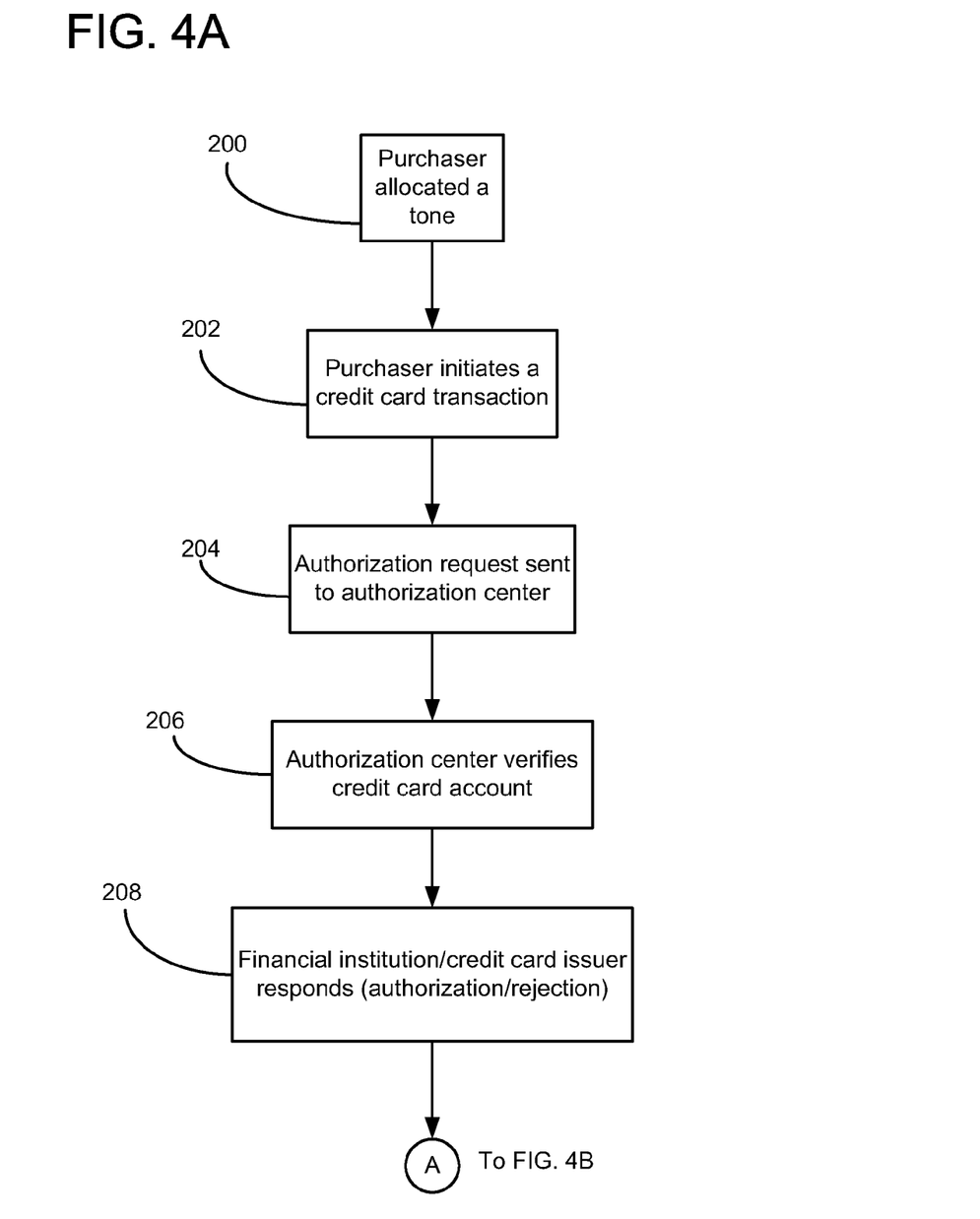
FIGS. 4A and 4B are flow charts of a method of broadcasting charge tones in the electronic transaction system of FIG. 1 according to the teachings of the present invention.
Figure 4B:
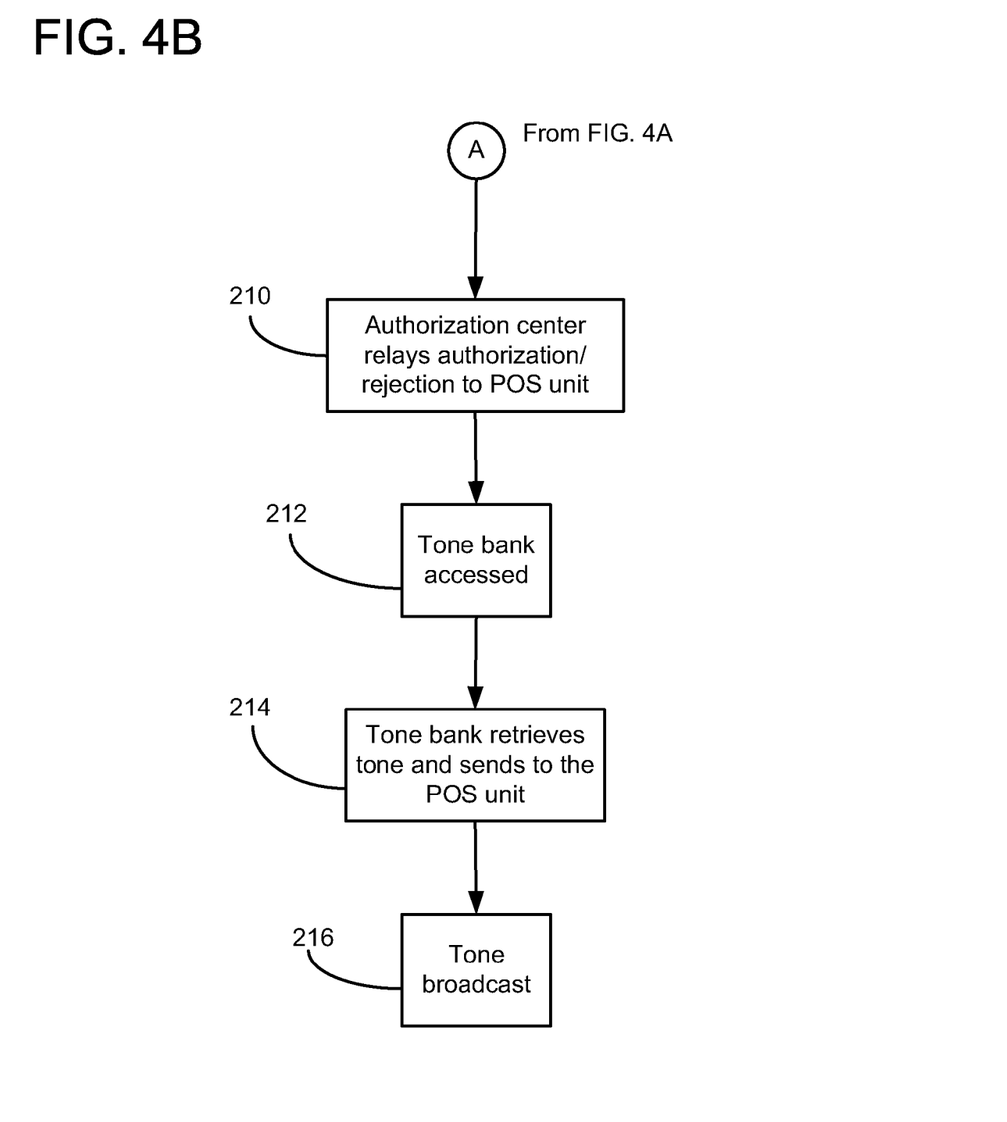

FIGS. 4A and 4B are flow charts of a method of broadcasting charge tones in the electronic transaction system 100 according to the teachings of the present invention. With reference to FIGS. 2, 3, 4A, and 4B, the method will now be explained. The method begins with step 200 where the purchaser, prior to use of the electronic transaction system 100, must be allocated, either through the purchase or award, one or more tones. The allocated tones and associated relevant credit card information are stored in the memory 130 of the tone bank 120. Next, in step 202, the purchaser 102 initiates a credit card transaction by interacting with the POS unit 106. Typically, the purchaser or merchant swipes the credit card through the POS unit 106 located at the point of sale (e.g., retail store, gas station, etc.) In step 204, an authorization request for the credit card transaction is then sent to the authorization center 108 via the communications link 110. In step 206, the authorization center then verifies that the purchaser's credit card account is a valid account and has available credit by querying the issuing financial institution/card issuer 112 via a communications link 114. The issuing financial institution/card issuer keeps and processes all transactions of the purchaser's credit card account. In step 208, the issuing financial institution/card issuer then responds to the query by either authorizing or rejecting the requested credit card transaction. In step 210, the authorization center then relays the authorization or rejection message to the merchant through the POS unit 106. Alternatively, the authorization center authenticates the credit card transaction without communicating with the issuing financial institution/card issuer 112. The merchant, upon receiving proper authorization from the authorization center, delivers the item to the purchaser. In step 212, during the authorization process, the tone bank is accessed through the interface 134, either by the financial institution/card issuer 112, the authorization center 108 or the POS unit 106. In step 214, the processor 132 receives the credit card transaction, retrieves the appropriate tone from the memory 130 and sends the retrieved tone to the POS unit 106 via the interface 134. In step 216, the retrieved tone is then broadcast through the speaker 122 to the purchaser 102. The retrieved tone may be broadcast during the waiting period of the authentication process or upon approval, thereby providing the purchaser an aural indication of the success of the credit card transaction.

The present invention may be utilized for any electronic transaction. In addition, other types of cards, such as gift cards may be utilized. Typically, gift cards are purchased and "loaded" with a specified amount of money for which the recipient may use the gift card to purchase items. If the gift card is associated with a specific occasion, such as a birthday or anniversary, the tone broadcast may be related to the occasion (e.g., Happy Birthday song or an anniversary song). In another example, for a religious holiday, such as Christmas, theme-based songs may be broadcast at the time of purchase. Additionally, greeting cards may be utilized. A greeting card may be sent to a recipient. The recipient may then conduct an electronic transaction at a POS unit, for which a greeting of some type is broadcast to the recipient.

Figure 5:
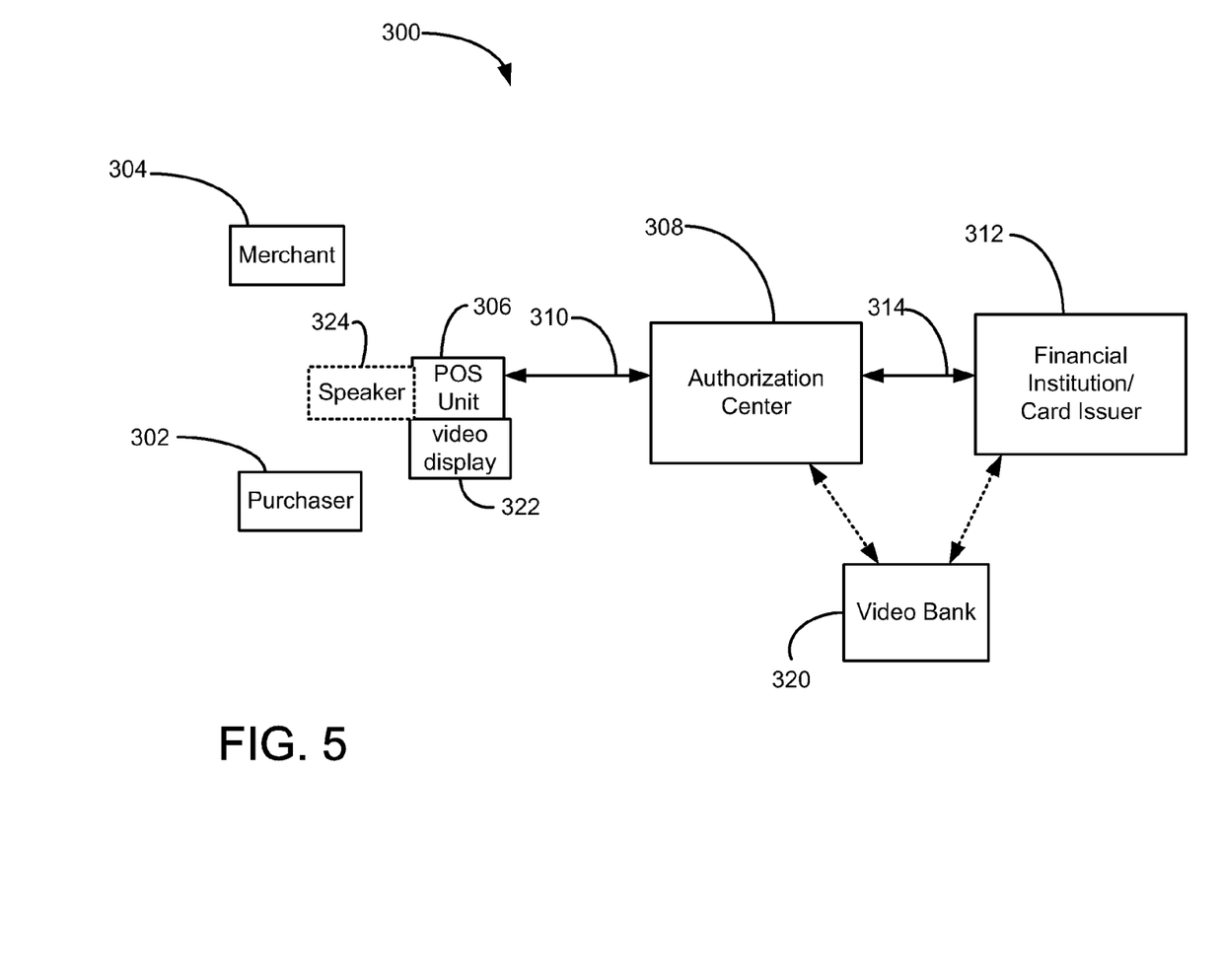
FIG. 5 is a block diagram illustrating components of an electronic transaction system for broadcasting a video stream in an alternate embodiment of the present invention.

FIG. 5 is a block diagram illustrating components of an electronic transaction system 300 for broadcasting a video stream in an alternate embodiment of the present invention. A purchaser 302 buys an item from a merchant 304 using a credit card. The purchaser typically swipes a credit card through a point of sale (POS) unit 306, which collects relevant credit card information for the purchase. The merchant, through the POS unit 306, then requests authorization for the credit card transaction by communicating with an authorization center 308 via a communications link 110. In most cases, the link 310 is a direct electronic link to the authorization center. The authorization center then verifies that the purchaser's credit card account is a valid account and has available credit by querying an issuing financial institution/card issuer 312 via a communications link 314. The issuing financial institution/card issuer keeps and processes all transactions of the purchaser's credit card account. The issuing financial institution/card issuer then responds to the query by either authorizing or rejecting the requested credit card transaction. The authorization center then relays the authorization or rejection message to the merchant through the POS unit 306. The merchant, upon receiving proper authorization from the authorization center, delivers the item to the purchaser.

The present invention includes a video bank 320 which stores one or more video streams purchased or allocated to the purchaser's credit card. The video stream may be a short video clip, a static visual display, a long video segment or any other visual display. The video stream may include sounds, such as tones or other aural indicia. Alternately, the video stream may be a visual credit, acknowledging the purchase transaction or advertising an item, retail store, or other entity. Either during the authorization process or after approval of the transaction, the POS unit retrieves a video stream (or any other visual display) from the video bank and broadcasts the video stream to the purchaser. The video bank may be coupled to the authorization center 308, the financial institution/card issuer 312, or the POS unit 306. Alternatively, the video bank may be a standalone unit. The video bank is preferably secured in a similar manner as information held on the user's credit card. Thus, a secure communication link, proper authentication of the credit card user and sufficient security to prevent hacking of the video bank is preferred. In an alternate embodiment of the present invention, the video bank may also incorporate tones and perform a dual function of operating as a tone bank.

The POS unit 306 includes a visual display 322 and optional speaker 324 or other visual device to broadcast the video stream. The term video stream is used to describe any type of visual presentation (either dynamic or static), such as a video clip, static visual display, etc. Additionally, the video stream may include sound. Prior to use of the electronic transaction system 300, the purchaser must be allocated one or more video streams, either by purchasing the video stream or being awarded the video stream. Each credit card may have its own specific video stream or video streams. If the credit card is allocated more than one video stream, the video streams may be rotated for each transaction. Alternately, the video stream may be chosen based on the type of transaction, point of sale, time of day, day of week, or any other manner.

Figure 6:
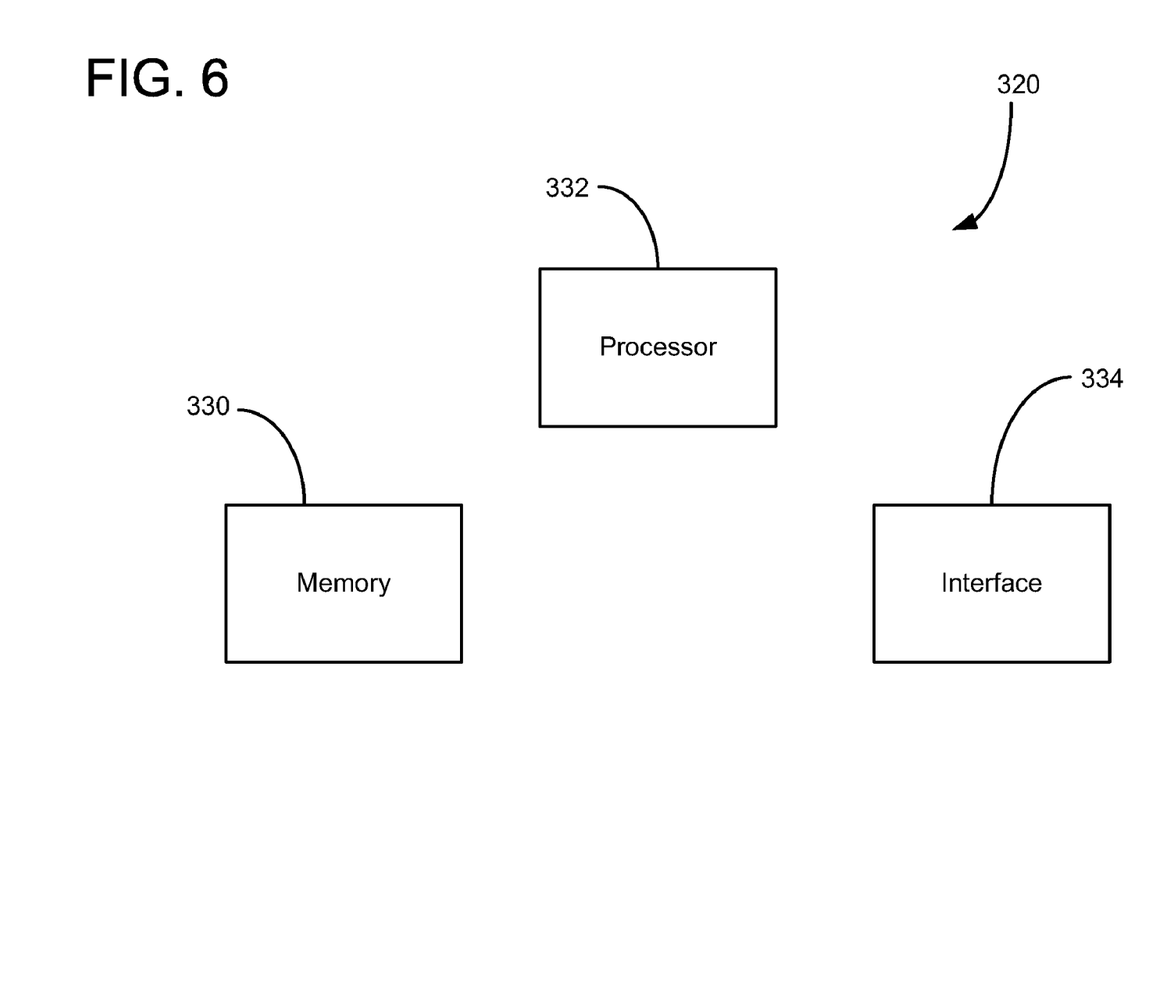
FIG. 6 is a simplified block diagram of the components of the video bank utilized in the electronic system of FIG. 5.

FIG. 6 is a simplified block diagram of the components of the video bank 320. The video bank 320 includes a memory 330, a processor 332, and an interface 334. The memory stores the video streams and relevant credit card information associated with the credit card transaction. The interface allows authorized access to the memory. Authorization may be through the authorization center or may include a separate authentication system. The purchaser may purchase or be awarded one or more video streams. The purchaser's credit card is then associated with the specified video stream, held in memory of the video bank. The processor is utilized for retrieving the relevant video stream for the credit card.

Prior to utilization of the electronic transaction system 300, one or more video streams must be allocated to the purchaser's credit card. For the purchase of video streams, the purchaser may access the video bank 320 either directly or via the financial institution/card issuer 312. For example, a website may be set up or coupled within the financial institution/card issuer 312's website, offering the sale of video streams. Alternately, the purchase of video streams may be conducted during a credit card transaction at the POS unit 306. The POS unit may query the purchaser for the purchase of the video stream. In an alternate embodiment of the present invention, the video streams may be awarded by the financial institution/card issuer, a retail store, or any other entity.

With reference to FIGS. 5 and 6, the operation of the electronic transaction system 300 for broadcasting a video stream will now be explained. The purchaser, prior to use of the electronic transaction system 300, must be allocated, either through the purchase or award, one or more video streams. The video streams and associated relevant credit card information are stored in the memory 330 of the video bank 320. Next, the purchaser 302 initiates a credit card transaction by swiping the purchaser's credit card through the POS unit 306. Alternatively, the merchant may swipe the card in the POS unit. An authorization request for the credit card transaction is then sent to the authorization center 308 via the communications link 310. The authorization center then verifies that the purchaser's credit card account is a valid account and has available credit by querying the issuing financial institution/card issuer 312 via a communications link 314. The issuing financial institution/card issuer keeps and processes all transactions of the purchaser's credit card account. The issuing financial institution/card issuer then responds to the query by either authorizing or rejecting the requested credit card transaction. The authorization center then relays the authorization or rejection message to the merchant through the POS unit 306. Alternately, the authorization center authenticates the credit card transaction without communicating with the issuing financial institution/card issuer 312. The merchant, upon receiving proper authorization from the authorization center, delivers the item to the purchaser. During the authorization process, the video bank is accessed through the interface 334, either by the financial institution/card issuer 312, the authorization center 308 or the POS unit 306. The processor 332 receives the credit card transaction, retrieves the appropriate video stream from the memory 330, and sends the retrieved video stream to the POS unit 306. The retrieved video is then broadcast through the visual display 322 to the purchaser 302. The retrieved video stream may be broadcast during the waiting period of the authentication process or upon approval, thereby providing the purchaser a visual indication of the success of the credit card transaction.

Figure 7A:
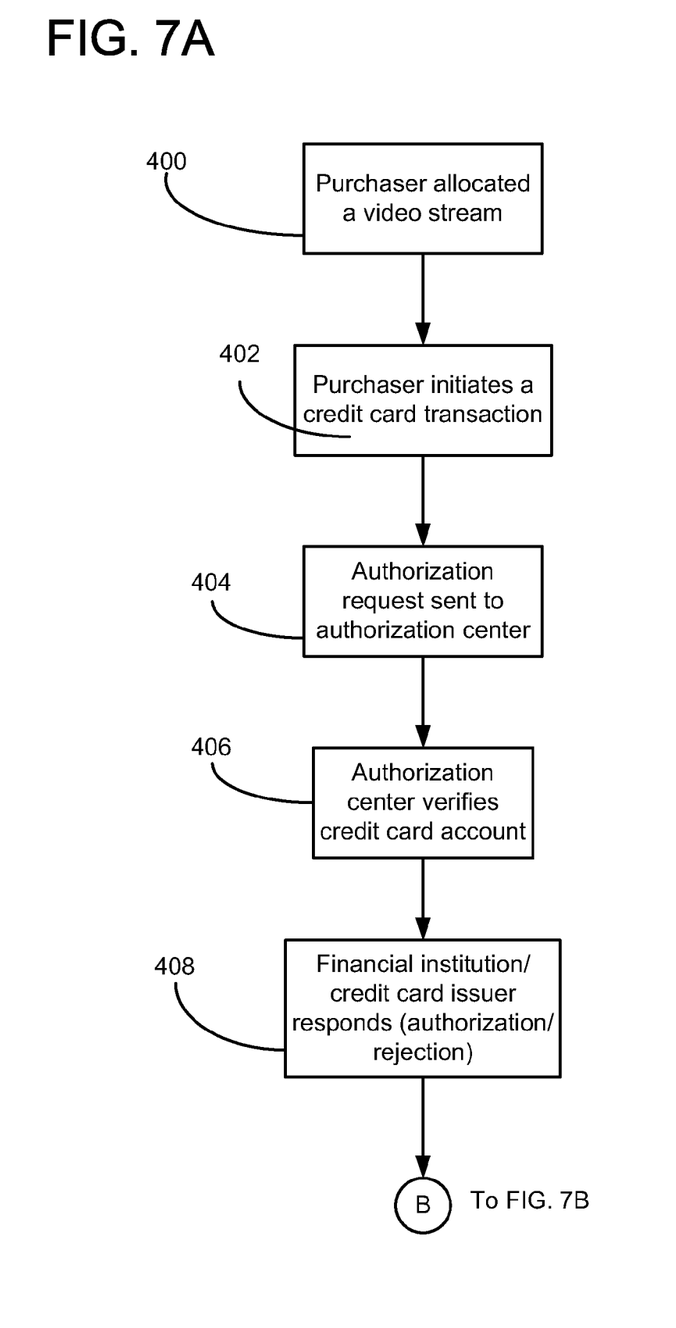
FIGS. 7A and 7B are flow charts of a method of broadcasting a video stream in the electronic transaction system of FIG. 5 according to the teachings of the present invention.
Figure 7B:
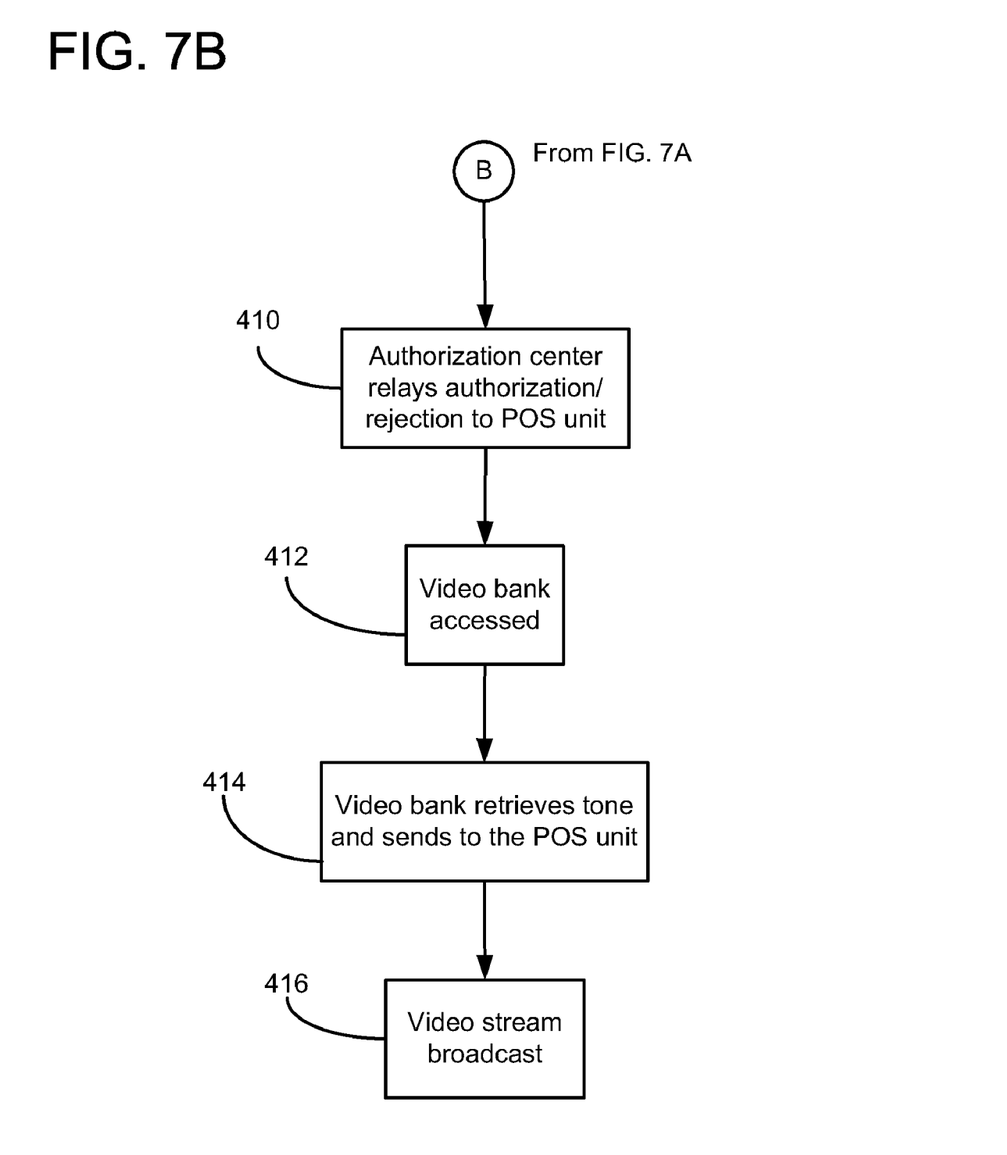

FIGS. 7A and 7B are flow charts of a method of broadcasting a video stream in the electronic transaction system 300 according to the teachings of the present invention. The method begins with step 400 where the purchaser, prior to use of the electronic transaction system 300, must be allocated, either through the purchase or award, one or more video streams. The allocated video streams and associated relevant credit card information are stored in the memory 330 of the video bank 320. Next, in step 402, the purchaser 302 initiates a credit card transaction by interacting with the POS unit 306. Typically, the purchaser or merchant swipes the credit card through the POS unit 306 located at the point of sale (e.g., retail store, gas station, etc.) In step 404, an authorization request for the credit card transaction is then sent to the authorization center 308 via the communications link 310. In step 406, the authorization center then verifies that the purchaser's credit card account is a valid account and has available credit by querying the issuing financial institution/card issuer 312 via a communications link 314. The issuing financial institution/card issuer keeps and processes all transactions of the purchaser's credit card account. In step 408, the issuing financial institution/card issuer then responds to the query by either authorizing or rejecting the requested credit card transaction. In step 410, the authorization center then relays the authorization or rejection message to the merchant through the POS unit 306. Alternately, the authorization center authenticates the credit card transaction without communicating with the issuing financial institution/card issuer 312. The merchant, upon receiving proper authorization from the authorization center, may deliver the item or service to the purchaser. In step 412, during the authorization process, the video bank is accessed through the interface 334, either by the financial institution/card issuer 312, the authorization center 108 or the POS unit 306. In step 414, the processor 332 receives the credit card transaction, retrieves the appropriate video stream from the memory 330 and sends the retrieved video stream to the POS unit 106 via the interface 134. In step 416, the retrieved video stream is then broadcast through the visual display 322 to the purchaser 302. The retrieved video stream may be broadcast during the waiting period of the authentication process or upon approval, thereby providing the purchaser a visual indication of the success of the credit card transaction.

In an alternate embodiment of the present invention, the video bank may store a photo identification of the credit card user. When the credit card user enacts a credit card transaction, a photograph of the credit card holder is retrieved from the memory of the video bank and sent to the POS unit. The photograph may then be displayed on the visual display. The merchant may then check the broadcast photograph with the person using the credit card. This would provide an additional security measure to authenticate the user's identity. This alternate embodiment is superior to existing credit cards which have photographs affixed to the credit card. In particular, photographs affixed to a credit card are easily altered. However, with this embodiment, it would not be possible to alter the photograph because of electronic storage of the photograph in the secure video bank.

The present invention may be utilized for any electronic transaction. For example, transaction via computer (e.g., laptop, desktop, or mobile phone) may also utilize the present invention. The POS unit may be the user's computing device and provide aural and/or visual indicia when conducting an electronic transaction. The video or tone bank may then retrieve the tone/video stream and provide it to the user's computing device. Likewise, the present invention may be utilized for phone transactions. When the credit card information is provided through the use of the phone's numeric keypad, the tone bank may be utilized and the tone retrieved for playback via the telephone. In addition, the present invention may be utilized to present advertisement to a customer via the POS unit (visually, aurally or both). Furthermore, it should be understood that the credit card transaction scenario is exemplary only and may be utilized on any credit card authentication system.

The present invention enables a credit card user to playback sounds or video streams, thereby providing entertainment to the user and those near the user. Additionally, the use of the present invention provides distinctiveness to the user (i.e., the charge tone or video stream) which encourages further usage of the credit card. In addition, the present invention may be utilized to provide another layer of security against fraudulent use of the credit card.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for broadcasting a tone during an electronic transaction, the system comprising:
    a point of sale (POS) unit for receiving credit card information from a credit card of a user utilized for an electronic transaction by the user;
    an authorization system for authorizing the electronic transaction by the credit card of the user;
    means for selecting a tone by the user;
    means for allocating the selected tone to the credit card of the user; and
    a tone bank for storing the selected tone, the tone bank associating the tone with the credit card information of the credit card of the user, the tone bank being separate from the credit card;
    wherein the POS unit includes broadcasting means for broadcasting the tone during an authorization process by the authorization center of the credit card information;
    whereby the stored tone is retrieved and broadcasted at the POS unit in response to utilizing the credit card information for the electronic transaction.

2. The system for broadcasting a tone of claim 1 wherein the tone is a song.

3. The system for broadcasting a tone of claim 1 wherein the tone is a plurality of musical notes.

4. The system for broadcasting a tone of claim 1 wherein the tone is a greeting.

5. The system for broadcasting a tone of claim 1 wherein the tone is an advertisement.

6. The system for broadcasting a tone of claim 1 wherein the tone is broadcast during an authorization process by the authorization center of the credit card information.

7. The system for broadcasting a tone of claim 1 wherein the tone is broadcast after successful authorization by the authorization center of the credit card information.

8. The system for broadcasting a tone of claim 1 wherein the tone bank stores a plurality of tones associated with the credit card information and the tone bank retrieves the tone for broadcasting based on a predetermined basis.

9. A method of broadcasting a tone during an electronic transaction, the method comprising the steps of:
    selecting a tone by a user of a credit card;
    allocating the selected tone to the user's credit card, the tone being associated with the credit card and stored in a tone bank separate from the credit card;
    initiating an electronic transaction utilizing the credit card;
    sending an authorization request by a point of sale (POS) unit to an authorization center, the authorization request requesting authorization for utilizing the user's credit card to conduct the electronic transaction;
    authorizing the electronic transaction by the user's credit card;
    retrieving the stored tone from the tone bank;
    sending the tone to the POS unit; and
    broadcasting the tone at the POS unit during an authorization process by the authorization center of the credit card information.

10. The method of broadcasting a tone during an electronic transaction of claim 9 wherein the tone is broadcast during the step of authorizing the electronic transaction by the credit card.

11. The method of broadcasting a tone during an electronic transaction of claim 9 wherein the tone is broadcast after the step of authorizing the electronic transaction by the credit card.

12. The method of broadcasting a tone during an electronic transaction of claim 9 wherein the tone bank stores a plurality of tones associated with the credit card information and the tone bank retrieves the tone for broadcasting based on a predetermined basis.

13. A system for broadcasting a tone during an electronic transaction, the system comprising:
    a point of sale (POS) unit for receiving credit card information from a specific card utilized for an electronic transaction by a user;
    an authorization system for authorizing the electronic transaction by the credit card;
    means for selecting a tone by the user; and
    a tone bank for storing the selected tone, the tone bank associating the tone with the credit card information of the specific card;
    wherein the POS unit includes broadcasting means for broadcasting the tone;
    the stored tone is retrieved and broadcast at the POS unit in response to utilizing the credit card information for the electronic transaction;
    wherein the tone is broadcast during an authorization process by the authorization center of the credit card information.

* * * * *